United States Patent
Chen et al.

(10) Patent No.: US 12,481,722 B2
(45) Date of Patent: Nov. 25, 2025

(54) PIPELINE FOR GENERATING SYNTHETIC POINT CLOUD DATA

(71) Applicant: GM Cruise Holdings LLC, San Francisco, CA (US)

(72) Inventors: Hongge Chen, Mountain View, CA (US); Zhao Chen, Mountain View, CA (US); Yuning Chai, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 264 days.

(21) Appl. No.: 18/339,955

(22) Filed: Jun. 22, 2023

(65) Prior Publication Data
US 2024/0303298 A1 Sep. 12, 2024

Related U.S. Application Data

(60) Provisional application No. 63/488,971, filed on Mar. 7, 2023.

(51) Int. Cl.
*G06F 18/22* (2023.01)
*G06T 15/00* (2011.01)
*G06T 17/00* (2006.01)

(52) U.S. Cl.
CPC ............ *G06F 18/22* (2023.01); *G06T 15/005* (2013.01); *G06T 17/00* (2013.01); *G06T 2210/56* (2013.01)

(58) Field of Classification Search
CPC ....... G06F 18/22; G06T 15/005; G06T 17/00; G06T 2210/56; G06V 10/82
See application file for complete search history.

(56) References Cited

U.S. PATENT DOCUMENTS

| | | | |
|---|---|---|---|
| 2018/0018805 A1* | 1/2018 | Kutliroff | G06V 20/20 |
| 2019/0050640 A1* | 2/2019 | Sarkar | G06V 30/416 |
| 2020/0342250 A1* | 10/2020 | Smirnov | G06V 10/764 |
| 2022/0067943 A1* | 3/2022 | Claessen | G06N 3/048 |

(Continued)

OTHER PUBLICATIONS

Tu, James, et al. "Physically realizable adversarial examples for lidar object detection." Proceedings of the IEEE/CVF Conference on Computer Vision and Pattern Recognition. 2020.

(Continued)

*Primary Examiner* — Daniel F Hajnik
*Assistant Examiner* — Thomas John Foster
(74) *Attorney, Agent, or Firm* — CANTOR COLBURN LLP (57) ABSTRACT

The present disclosure provides solutions for generating synthetic three-dimensional (3D) objects for testing autonomous vehicle (AV) object detectors, such as AV Light Detection and Ranging (LiDAR) detectors. A process of the disclosed technology can include steps for receiving a first set of object shape data corresponding to a baseline object, permuting the first set of object shape data to generate a second set of object shape data, and providing the second set of object shape data to a differentiable pipeline to generate an output scene, wherein the output scene contains an optimized object that is based on the second set of object shape data. The process can further include steps for determining, using a detector, if the optimized object can be identified in the output scene. Systems and machine-readable media are also provided.

20 Claims, 6 Drawing Sheets

(56) References Cited

U.S. PATENT DOCUMENTS

2023/0131935 A1* 4/2023 Volkovs .............. G06V 10/774
  382/159
2023/0177849 A1* 6/2023 Ambrus ................ G06V 10/82
  382/103

OTHER PUBLICATIONS

Cao, Yulong, et al. "Adversarial objects against lidar-based autonomous driving systems." arXiv preprint arXiv:1907.05418 (2019).

\* cited by examiner

PIPELINE FOR GENERATING SYNTHETIC POINT CLOUD DATA

BACKGROUND

This application claims priority to U.S. Provisional Patent Application No. 63/488,971, entitled "PIPELINE FOR GENERATING SYNTHETIC POINT CLOUD DATA", filed on Mar. 7, 2023, the contents of which are incorporated herein by reference in their entirety and for all purposes.

1. TECHNICAL FIELD

The present disclosure generally relates to synthetic object generation and in particular, to methods for generating synthetic three-dimensional (3D) objects that are optimized for testing autonomous vehicle (AV) object detectors, such as AV Light Detection and Ranging (LiDAR) detectors.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions conventionally performed by human drivers, such as performing navigation and routing tasks necessary to provide safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning, and obstacle avoidance.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail by the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

As computer vision models, such as object detectors, become ubiquitous in real-world applications, their reliability is an increasing safety concern. Autonomous vehicles (AVs), for example, rely on neural network-based detectors to identify, and reason about objects in the surrounding environment. In such applications, the malfunction of such models can result in dangerous events, such as vehicle collisions.

Like most statistical models, contemporary detectors often fail to reliably detect rare or unknown objects. Conventional solutions for improving detector accuracy tend to be reactive, such as by the collection of new or additional data to improve training on pre-identified object instances. However, because detector failures can lead to critical safety events in certain applications, such as when used by AVs, it would be beneficial to proactively detect potential failures and improve accuracy before detector deployment.

Aspects of the disclosed technology provide solutions for identifying challenging (optimized) object instances, such as objects that are difficult to identify or classify using machine-learning based detectors. For example, optimized objects can include objects with low-relative detection scores when exposed to a detection model, such as a Light Detection and Ranging (LiDAR) detector. By identifying, optimized (challenging) object instances, detector deficiencies can be assessed, and detector accuracy can ultimately be improved for specific object shapes and/or poses before the detector is deployed for use in real-world scenarios.

In some approaches, object shape and/or pose parameters can be perturbed to generate optimized objects that are rendered into an output scene. Object detection can then be performed (using an object detector) to identify and/or classify objects in the output scene. Gradient signals resulting from the detector output can then be used to further perturb the shape and/or pose parameters, for example, until the output object is no longer detectable by the MIL based detector. In some instances, the resulting optimized object can be used to identify object features or characteristics that are difficult for the ML based detector to identify. Additionally, optimized output objects can be used to perform further ML detector training. By identifying difficult object and/or object characteristics, and performing additional training using those optimized objects, the optimized objects can be used to improve detector robustness.

Figure 1:
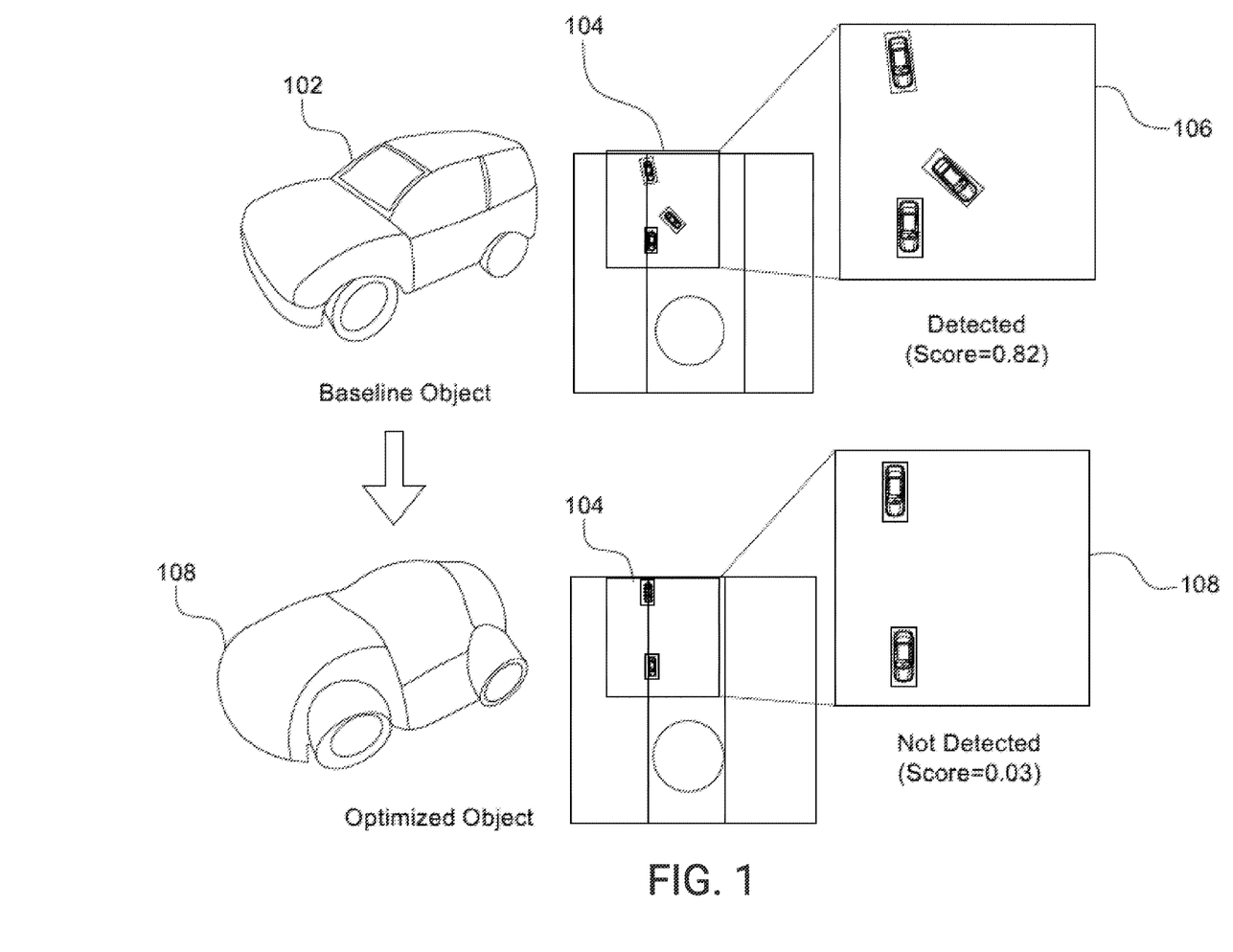
FIG. 1 conceptually illustrates an example of autonomous vehicle (AV) detector performance for a baseline object as compared to an optimized challenge object 108.

FIG. 1 conceptually illustrates examples of autonomous vehicle (AV) detector performance for a baseline object 102 and an optimized (challenge) object 108. In the example of FIG. 1, baseline object 102 is inserted into scene 104, and is detected at detection step 106. As discussed above, detection can be performed using a machine-learning based detector such as a LiDAR detector that is implemented as part of the AV perception stack. For example, the LiDAR detector can consist of one or more machine-learning models that are trained to detect, and in some instances identify, various objects represented by LiDAR point cloud data. As illustrated by FIG. 1, object detections can be indicated with a bounding box (or footprint) as discussed in further detail below with respect to FIG. 5.

Baseline object 102 can be a digital asset such as a three-dimensional (3D) representation of an object an AV may encounter during driving operations, such as another vehicle, pedestrian, or other traffic participant. However, it is understood that baseline object 102 may represent any object that can be detected by various AV sensor systems (e.g., LiDAR, cameras, radar, etc.), without departing from the scope of the disclosed technology. In the example of FIG. 1, baseline object 102 can be a 3D object, such as a 3D mesh and/or point cloud data representing virtually any 3D object. Baseline object 102 may be received or retrieved from a 3D asset database (not illustrated). In some approaches, a geometry (or shape) and/or pose (or location) of baseline object 102 may be represented using a vector notation, such as, through representation using one or more vectors or arrays.

Baseline object 102 can be rendered and inserted into a scene 104, for example, that represents a traffic scene or a portion of another environment that may be encountered by an AV. That is, scene 104 can be a synthetic (or virtual) scene that can be used to test various aspects of AV performance. Detection of objects in scene 104 can then be performed using one or more AV detectors, such as one or more ML based detectors implemented as part of the AV's perception stack. In such approaches, AV perception is performed on a simulated environment represented by scene 104. Detected objects within scene 104 can each be represented, for example, by bounding boxes placed around a boundary of each respective object, as illustrated in detection step 106. In this example, baseline object 104 is positively identified in detection step 106, e.g., by a LiDAR detector of the AV perception stack.

Various characteristics of a baseline object, such as object geometry (shape) and/or pose (or location) can then be modified (permuted) to generate a new (optimized) object or challenge object. By permuting features of baseline object 102, resulting optimized objects (e.g., optimized object 104) can be used to test various aspects of detector functionality.

Optimized object 108 can be inserted into scene 104, and in instances where the altered geometry/shape and/or pose/location of optimized object causes the object to evade detection (e.g., by the LiDAR detector), then the optimized object is not detected, as indicated by the lack of bounding box around the optimized object (step 108). By generating objects that challenge detector performance, aspects of the disclosed technology provide solutions for generating novel or rare object instances that can be used to proactively train AV detectors, for example, by performing further training using object geometries and/or poses that are difficult for the detector to accurately identify.

Figure 2:
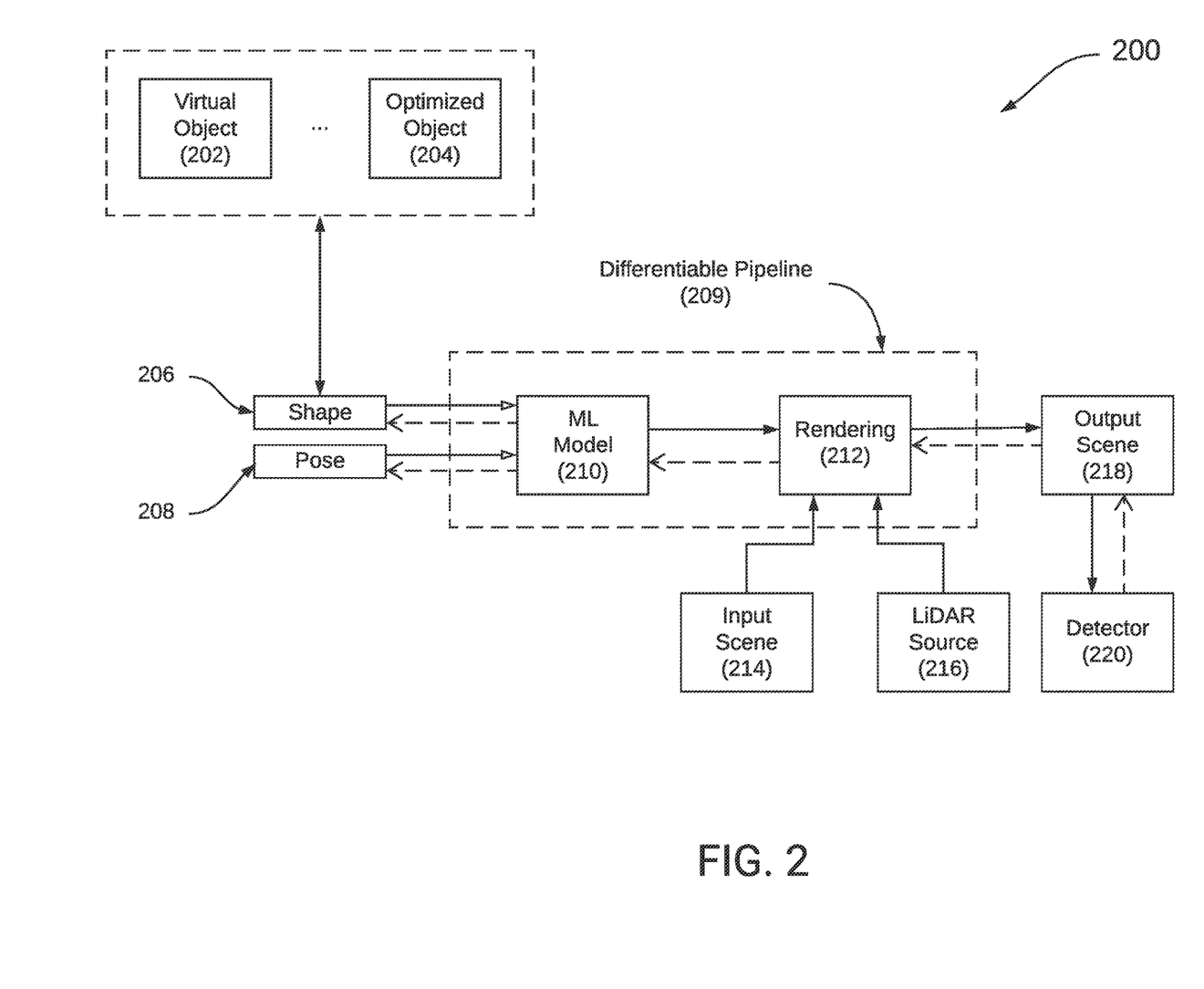
FIG. 2 illustrates an example system for generating optimized objects for use in testing an AV detector, according to some examples of the present disclosure.

FIG. 2 illustrates an example system 200 for generating optimized objects for use in testing an AV detector, such as a machine-learning (ML) based LiDAR detector, as discussed above. For example, system 200 can be used to generate virtual objects that evade detection by ML-based detectors, and which can, in turn, be used to perform additional detector training, thereby increasing the performance and robustness of the AV object detector/s.

Initially, a virtual (baseline) object 202 is received, e.g., from a virtual asset database. Characteristics of baseline object 202 can then be permuted to modify shape parameters of baseline object 202, thereby producing an optimized object (block 204). The optimized object is then provided to a differentiable pipeline 209, for example by providing, as input to differentiable pipeline 209, shape characteristics (or shape vectors) 206, representing the modified/permuted objects, and pose characteristics (or pose vectors) 208, representing the object location and/or pose. In some approaches, differentiable pipeline 209 can include a ML model configured to output object-point correspondence information, for example, that can be a data structure, or network, for which the shape and pose of the optimized object and the LiDAR points on the optimized object (after placing it into a synthetic scene) can be established.

Depending on the approach, the ML model 210 of the differentiable pipeline may be a deep Signed Distance Function (DeepSDF) network. In some aspects, outputs of ML model 210 can then be provided as inputs to a rendering process 212 that is configured to additionally ingest input scene data 214, and LiDAR source information 216, along with the object-point correspondence information from deep SDF 210 to produce an output scene 218. LiDAR source information 216 can include the location of LiDAR sensors and the correspondence information between LiDAR sensors and points in the scene. Alternatively, in some aspects, ML model 210 may be configured to perform rendering operations, without the need for rendering process 212.

Output scene 218 can then be analyzed by detector 220, for example, to determine if the optimized object (e.g., defined by shape parameters 206 and pose parameters 208) can be detected in output scene 218. Object detections can be generated by detector 220 as probabilities, e.g., on an interval of [0,1], wherein 0 can indicate a low detection confidence, e.g., that the optimized object was not detected, and 1 can indicate a high detection confidence, e.g., that the optimized object was definitively detected. In such instances, object detection may be determined based on a probability threshold. For example, it may be determined that the optimized object is detected if the detector output is greater than 0.50, or greater than 0.75, etc. For instances in which the optimized object is detected, a gradient signal (generated by a loss function of detector 220) can be back propagated and used to further permute shape parameters of optimized object 204, which can then be provided as new input shape parameters 206. That is, back propagation can be used to iteratively permute optimized object 204, until a detection confidence of detector 220 is below the predetermined threshold (e.g., 0.50), indicating that the characteristics of optimized object have been permuted (in manner or degree) sufficiently to evade detection by detector 220.

By iteratively permuting shape parameters for the optimized shape, novel object geometries that frustrate detector 220 performance can be proactively identified and used to preemptively train detector 220, thereby improving overall detector performance and in particular, performance on rare or novel object geometries.

Figure 3:
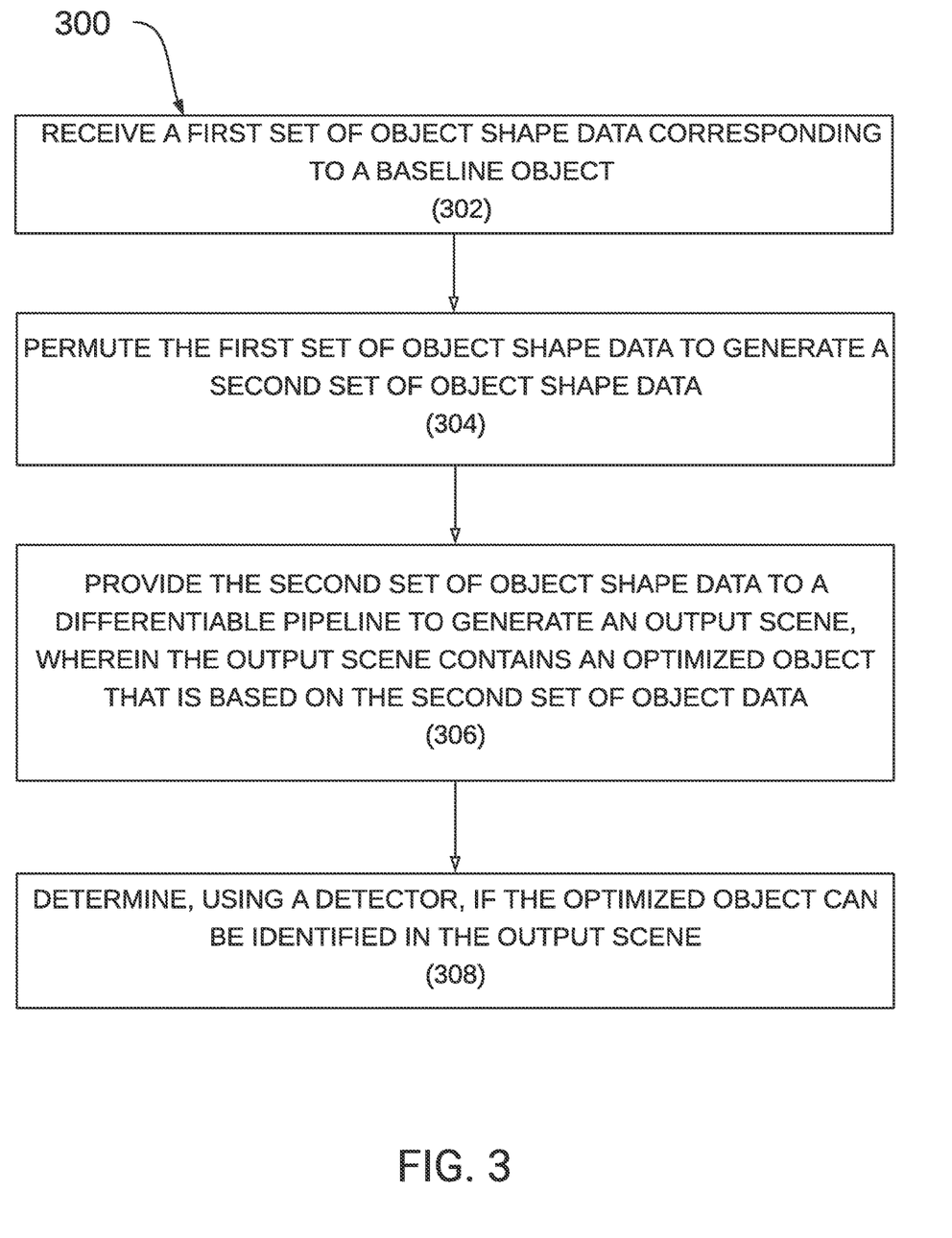
FIG. 3 illustrates an example process for generating optimized objects for use in testing an AV detector, according to some examples of the present disclosure.

FIG. 3 illustrates an example process 300 for generating optimized objects for use in testing an AV detector. At step 302, process 300 includes receiving a first set of object shape data corresponding to a baseline object. Depending on the implementation, the geometry or shape of the baseline object may be represented using a vector notation, such as, through representation using one or more vectors or arrays. As discussed above, the baseline object may be a 3D asset, for example, that has been generated from collected AV sensor data, or that has been synthetically generated.

At step 304, process 300 includes permuting the first set of object shape data to generate a second set of object shape data. The second set of shape data can correspond with an optimized/permuted object, for example that is designed to foil identification attempts by ML based detectors, such as LiDAR detectors implemented in the perception layer of the AV software stack.

At step 306, process 300 includes providing the second set of object shape data to a differentiable pipeline for use in generating an output scene. The output scene can contain an optimized object that is based on the second set of object data. For example, the differentiable pipeline can include a deep Signed Distance Function (deep SDF) network, such as that discussed in relation to FIG. 2, above. Outputs of the deep SDF can then be provided as inputs to a rendering process that is configured to additionally ingest input scene data, and LiDAR source information, along with the object-point correspondence information from deep SDF to produce the output scene.

At step 308, process 300 includes determining, using a detector, if the optimized object can be identified in the output scene. For instances in which the optimized object is detected, a gradient signal can be back propagated and used to further permute shape parameters (or shape data) associated with the optimized object. For example, permutation can be performed to generate a third set of shape data that can be used to test detector performance. Permutations to shape data and/or pose/location data can be iteratively performed until detector performance confidence falls below a predetermined threshold, for example, indicating that the optimized object (corresponding with the current shape and/or pose vectors) was sufficient to evade detection by the AV detector.

Figure 4:
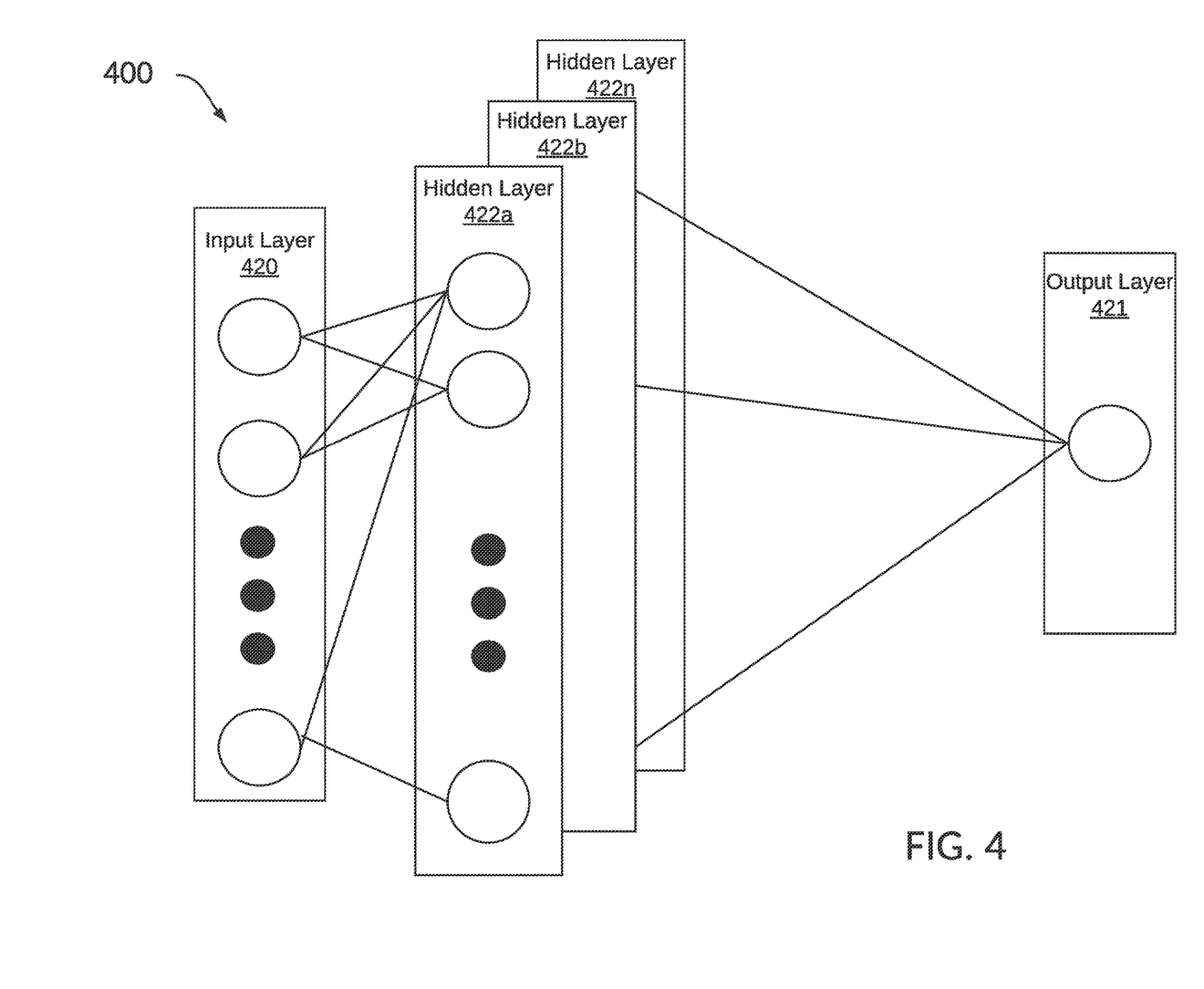
FIG. 4 illustrates an example of a deep learning neural network that can be used to perform object detection, according to some aspects of the disclosed technology.

FIG. 4, the disclosure now turns to a further discussion of models that can be used through the environments and techniques described herein. FIG. 4 is an example of a deep learning neural network 400 that can be used to implement all or a portion of the systems and techniques described herein e.g., neural network 400 can be used to implement a perception module (or perception system) such as an object detector, as discussed above). An input layer 420 can be configured to receive sensor data and/or data relating to an environment surrounding an AV. Neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. Neural network 400 further includes an output layer 421 that provides an output resulting from the processing performed by the hidden layers 422a, 422b, through 422n.

Neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 421.

In some cases, the neural network 400 can adjust the weights of the nodes using a training process called back-propagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
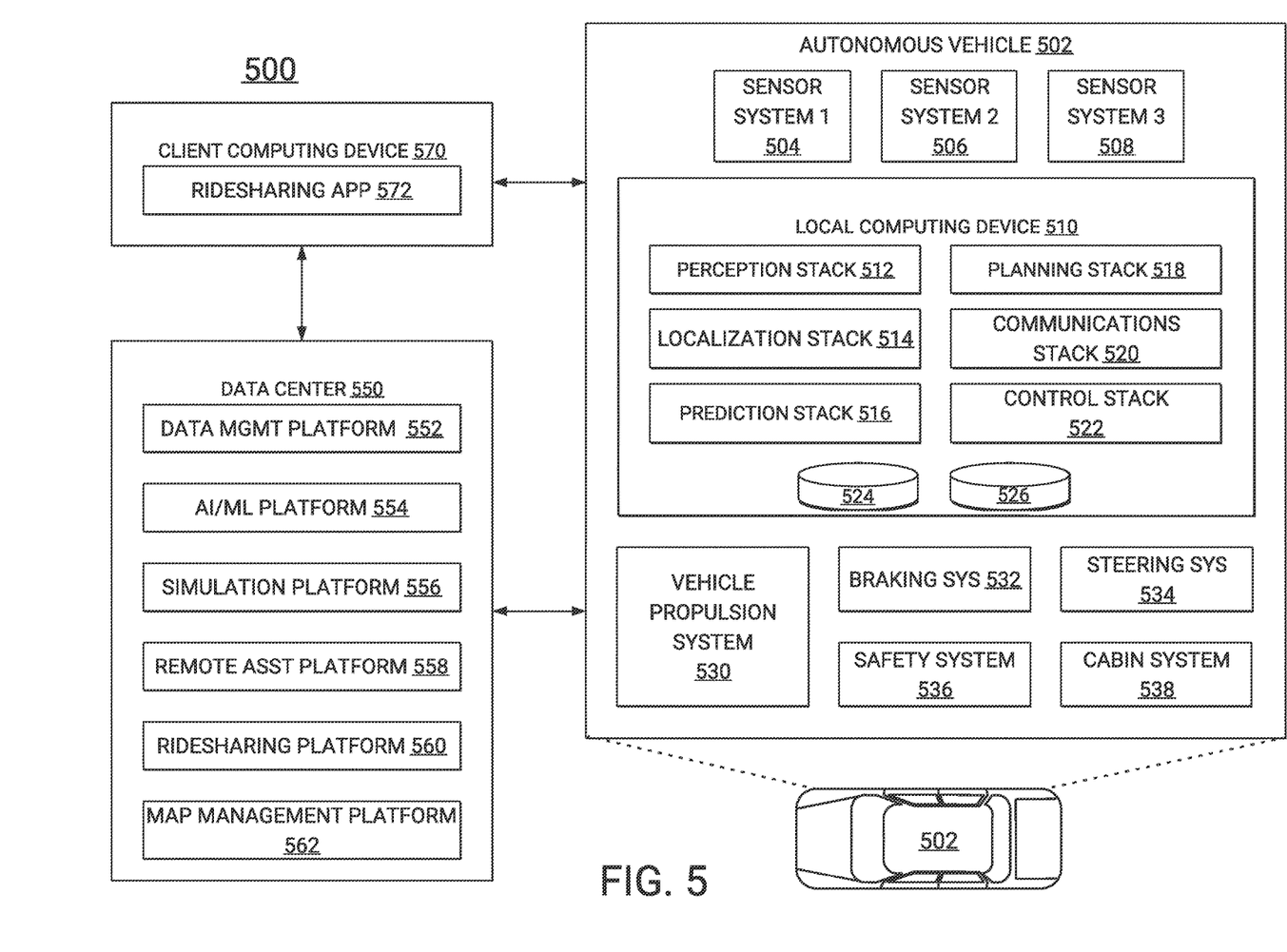
FIG. 5 illustrates an example system environment that can be used to facilitate autonomous vehicle (AV) dispatch and operations, according to some aspects of the disclosed technology.

FIG. 5 is a diagram illustrating an example autonomous vehicle (AV) environment 500, according to some examples of the present disclosure. One of ordinary skill in the art will understand that, for the AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SO-NAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

Prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ridehailing service (e.g., a ridesharing service), a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridehailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridehailing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridehailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridehailing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridehailing platform 560 can interact with a customer of a ridehailing service via a ridehailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 572. The client computing device 570 can be a customer's mobile computing device or a computing device integrated with the AV 502 (e.g., the local computing device 510). The ridehailing platform 560 can receive requests to pick up or drop off from the ridehailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridehailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
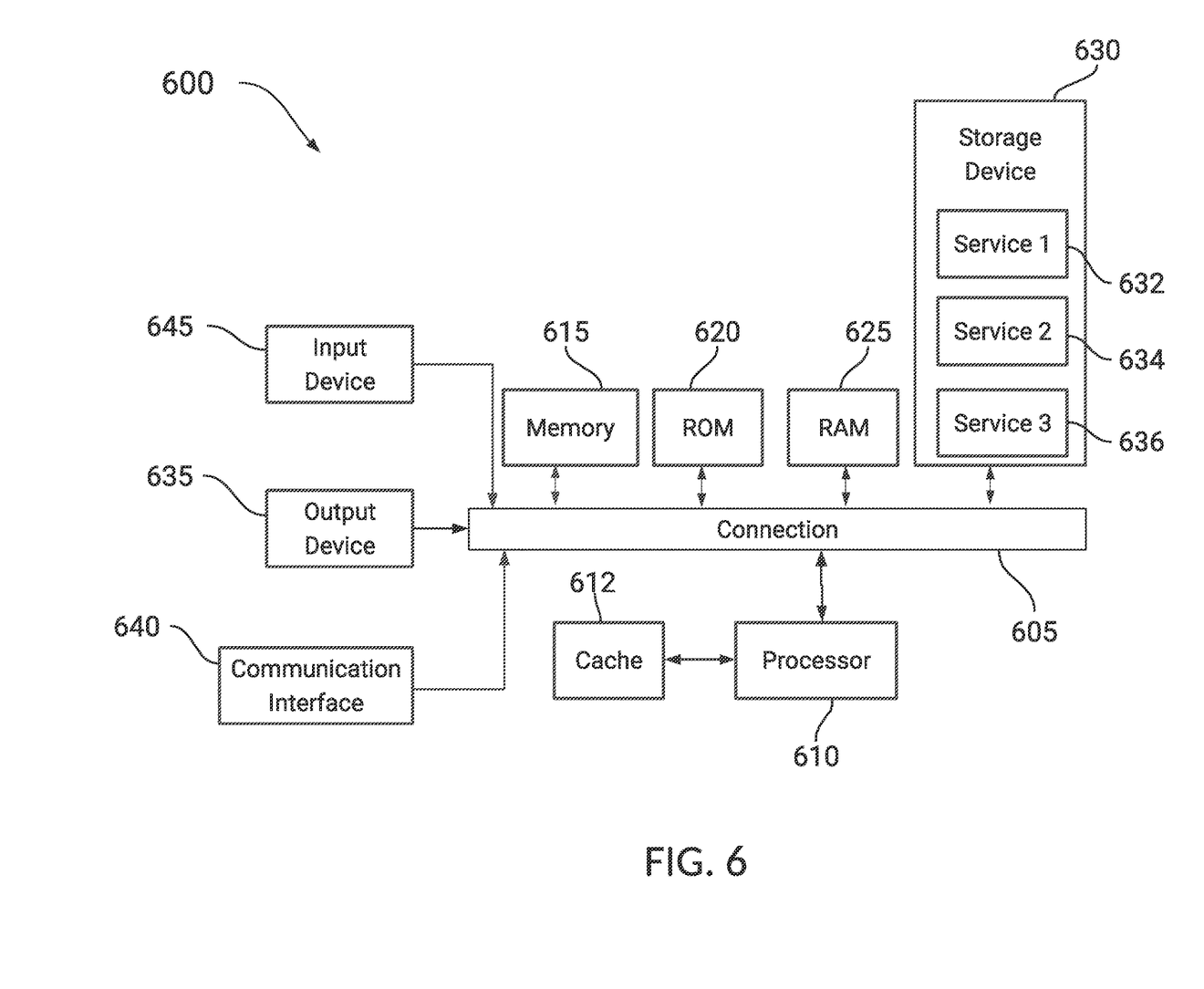
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some (or all) functions for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Aspects of the Invention can include:

Aspect 1. An apparatus comprising: at least one memory; and at least one processor coupled to the at least one memory, the at least one processor configured to: receive a first set of object shape data corresponding to a baseline object; permute the first set of object shape data to generate a second set of object shape data; provide the second set of object shape data to a differentiable pipeline to generate an output scene, wherein the output scene contains an optimized object that is based on the second set of object shape data; and determine, using a detector, if the optimized object can be identified in the output scene.

Aspect 2. The apparatus of aspect 1, wherein the differentiable pipeline comprises at least one Signed Distance Function (SDF) neural network, and wherein the at least one processor is further configured to: receive object-point correspondence information from the SDF neural network; render the output scene based on the object-point correspondence information.

Aspect 3. The apparatus of any of aspects 1-2, wherein the first set of object shape data comprises one or more vectors describing a three-dimensional (3D) geometry of the baseline object.

Aspect 4. The apparatus of any of aspects 1-3, wherein the detector is a neural network that has been trained to detect Light Detection and Ranging (LiDAR) point-cloud objects.

Aspect 5. The apparatus of any of aspects 1-4, wherein the differentiable pipeline is configured to receive input scene information.

Aspect 6. The apparatus of any of aspects 1-5, wherein the at least one processor is further configured to: generate, using the detector, a gradient signal that is based on whether or not the optimized object can be identified in the output scene; and permute the second set of object shape data based on the gradient signal.

Aspect 7. The apparatus of any of aspects 1-6, wherein the differentiable pipeline is configured to receive Light Detection and Ranging (LiDAR) source information.

Aspect 8. A computer-implemented method comprising: receiving a first set of object shape data corresponding to a baseline object; permuting the first set of object shape data to generate a second set of object shape data; providing the second set of object shape data to a differentiable pipeline to generate an output scene, wherein the output scene contains an optimized object that is based on the second set of object shape data; and determining, using a detector, if the optimized object can be identified in the output scene.

Aspect 9. The computer-implemented method of aspect 8, wherein the differentiable pipeline comprises at least one Signed Distance Function (SDF) neural network, and wherein the computer-implemented method further comprises: receiving object-point correspondence information from the SDF neural network; rendering the output scene based on the object-point correspondence information.

Aspect 10. The computer-implemented method of any of aspects 8-9, wherein the first set of object shape data comprises one or more vectors describing a three-dimensional (3D) geometry of the baseline object.

Aspect 11. The computer-implemented method of any of aspects 8-10, wherein the detector is a neural network that has been trained to detect Light Detection and Ranging (LiDAR) point-cloud objects.

Aspect 12. The computer-implemented method of any of aspects 8-11, wherein the differentiable pipeline is configured to receive input scene information.

Aspect 13. The computer-implemented method of any of aspects 8-12, further comprising: generating, using the detector, a gradient signal that is based on whether or not the optimized object can be identified in the output scene; and permuting the second set of object shape data based on the gradient signal.

Aspect 14. The computer-implemented method of any of aspects 8-13, wherein the differentiable pipeline is configured to receive Light Detection and Ranging (LiDAR) source information.

Aspect 15. A non-transitory computer-readable storage medium comprising at least one instruction for causing a computer or processor to: receive a first set of object shape data corresponding to a baseline object; permute the first set of object shape data to generate a second set of object shape data; provide the second set of object shape data to a differentiable pipeline to generate an output scene, wherein the output scene contains an optimized object that is based on the second set of object shape data; and determine, using a detector, if the optimized object can be identified in the output scene.

Aspect 16. The non-transitory computer-readable storage medium of aspect 15, wherein the differentiable pipeline comprises at least one Signed Distance Function (SDF) neural network, and wherein the at least one instruction is further configured to cause the computer or processor to: receive object-point correspondence information from the SDF neural network; render the output scene based on the object-point correspondence information.

Aspect 17. The non-transitory computer-readable storage medium of any of aspects 15-16, wherein the first set of object shape data comprises one or more vectors describing a three-dimensional (3D) geometry of the baseline object.

Aspect 18. The non-transitory computer-readable storage medium of any of aspects 15-17, wherein the detector is a neural network that has been trained to detect Light Detection and Ranging (LiDAR) point-cloud objects.

Aspect 19. The non-transitory computer-readable storage medium of any of aspects 15-18, wherein the differentiable pipeline is configured to receive input scene information.

Aspect 20. The non-transitory computer-readable storage medium of any of aspects 15-19, wherein the at least one instruction is further configured to cause the computer or processor to: generate, using the detector, a gradient signal that is based on whether or not the optimized object can be identified in the output scene; and permute the second set of object shape data based on the gradient signal.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:
   at least one memory; and
   at least one processor coupled to the at least one memory, the at least one processor configured to:
   receive a first set of object shape data corresponding to a baseline object;
   permute the first set of object shape data to generate a second set of object shape data;
   provide the second set of object shape data to a differentiable pipeline to generate an output scene, wherein the output scene contains an optimized object that is based on the second set of object shape data; and
   determine, using a detector, if the optimized object can be identified in the output scene.

2. The apparatus of claim 1, wherein the differentiable pipeline comprises at least one Signed Distance Function (SDF) neural network, and wherein the at least one processor is further configured to:
   receive object-point correspondence information from the SDF neural network; and
   render the output scene based on the object-point correspondence information.

3. The apparatus of claim 1, wherein the first set of object shape data comprises one or more vectors describing a three-dimensional (3D) geometry of the baseline object or a pose of the baseline object.

4. The apparatus of claim 1, wherein the detector is a neural network that has been trained to detect Light Detection and Ranging (LiDAR) point-cloud objects.

5. The apparatus of claim 1, wherein the differentiable pipeline is configured to receive input scene information.

6. The apparatus of claim 1, wherein the at least one processor is further configured to:
   determine if the optimized object can be identified in the output scene by detecting for the optimized object in the output scene, using the detector;
   generate, using the detector, a gradient signal based on the detector identifying the optimized object in the output scene; and
   permute, using the differentiable pipeline, the second set of object shape data based on the gradient signal.

7. The apparatus of claim 1, wherein the differentiable pipeline is configured to receive Light Detection and Ranging (LiDAR) source information.

8. A computer-implemented method comprising:
   receiving a first set of object shape data corresponding to a baseline object;
   permuting the first set of object shape data to generate a second set of object shape data;
   providing the second set of object shape data to a differentiable pipeline to generate an output scene, wherein the output scene contains an optimized object that is based on the second set of object shape data; and
   determining, using a detector, if the optimized object can be identified in the output scene.

9. The computer-implemented method of claim 8, wherein the differentiable pipeline comprises at least one Signed Distance Function (SDF) neural network, and wherein the computer-implemented method further comprises:
   receiving object-point correspondence information from the SDF neural network; and rendering the output scene based on the object-point correspondence information.

10. The computer-implemented method of claim 8, wherein the first set of object shape data comprises one or more vectors describing a three-dimensional (3D) geometry of the baseline object or a pose of the baseline object.

11. The computer-implemented method of claim 8, wherein the detector is a neural network that has been trained to detect Light Detection and Ranging (LiDAR) point-cloud objects.

12. The computer-implemented method of claim 8, wherein the differentiable pipeline is configured to receive input scene information.

13. The computer-implemented method of claim 8, wherein:
   determining if the optimized object can be identified in the output scene comprises detecting for the optimized object in the output scene, using the detector, and the computer-implemented method further comprises:
   generating, using the detector, a gradient signal based on the detector identifying the optimized object in the output scene; and
   permuting, using the differentiable pipeline, the second set of object shape data based on the gradient signal.

14. The computer-implemented method of claim 8, wherein the differentiable pipeline is configured to receive Light Detection and Ranging (LiDAR) source information.

15. A non-transitory computer-readable storage medium comprising at least one instruction for causing a computer or processor to:
   receive a first set of object shape data corresponding to a baseline object;
   permute the first set of object shape data to generate a second set of object shape data;
   provide the second set of object shape data to a differentiable pipeline to generate an output scene, wherein the output scene contains an optimized object that is based on the second set of object shape data; and
   determine, using a detector, if the optimized object can be identified in the output scene.

16. The non-transitory computer-readable storage medium of claim 15, wherein the differentiable pipeline comprises at least one Signed Distance Function (SDF) neural network, and wherein the at least one instruction is further configured to cause the computer or processor to:
   receive object-point correspondence information from the SDF neural network; render the output scene based on the object-point correspondence information.

17. The non-transitory computer-readable storage medium of claim 15, wherein the first set of object shape data comprises one or more vectors describing a three-dimensional (3D) geometry of the baseline object or a pose of the baseline object.

18. The non-transitory computer-readable storage medium of claim 15, wherein the detector is a neural network that has been trained to detect Light Detection and Ranging (LiDAR) point-cloud objects.

19. The non-transitory computer-readable storage medium of claim 15, wherein the differentiable pipeline is configured to receive input scene information.

20. The non-transitory computer-readable storage medium of claim 15, wherein the at least one instruction is further configured to cause the computer or processor to:
   determine if the optimized object can be identified in the output scene by detecting for the optimized object in the output scene, using the detector;
   generate, using the detector, a gradient signal based on the detector identifying the optimized object in the output scene; and
   permute, using the differentiable pipeline, the second set of object shape data based on the gradient signal.

* * * * *